Feb. 16, 1943.  W. P. SCHMITTER  2,311,597

POWER TRANSMISSION

Filed Feb. 26, 1941   3 Sheets-Sheet 1

Walter P. Schmitter
INVENTOR.

BY Ralph W. Brown
ATTORNEY.

Feb. 16, 1943.  W. P. SCHMITTER  2,311,597
POWER TRANSMISSION
Filed Feb. 26, 1941  3 Sheets-Sheet 2
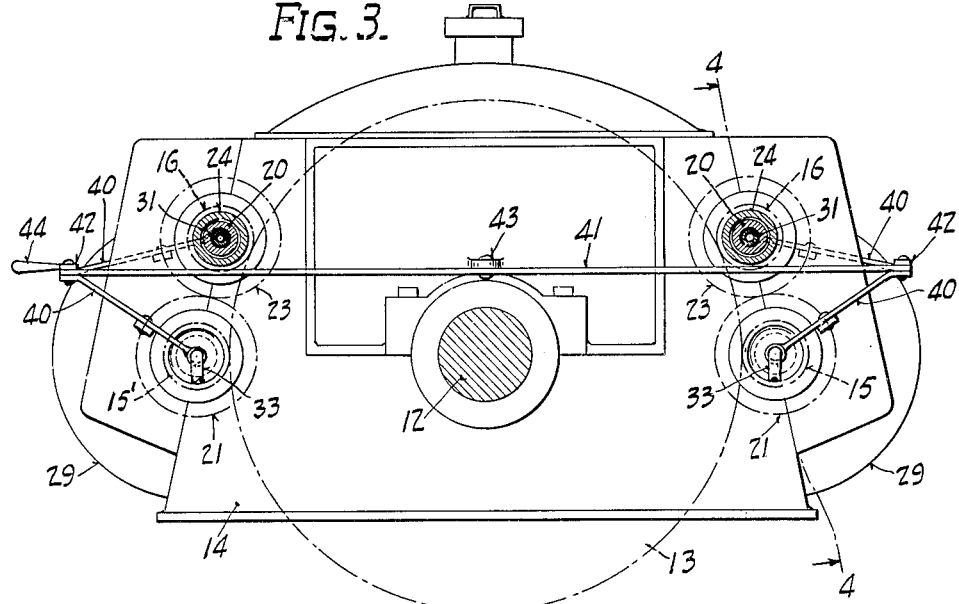
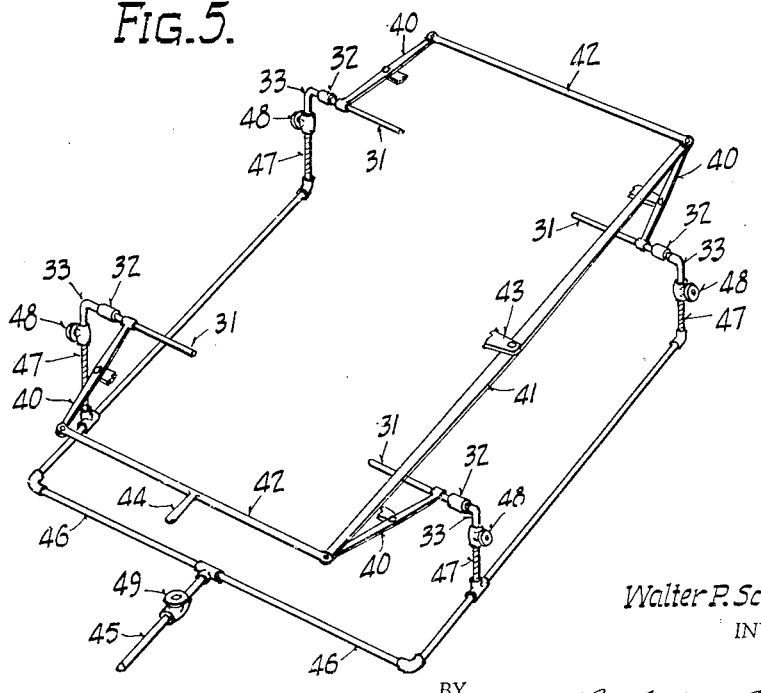
Walter P. Schmitter
INVENTOR.
BY
ATTORNEY.

Feb. 16, 1943.    W. P. SCHMITTER    2,311,597
POWER TRANSMISSION
Filed Feb. 26, 1941    3 Sheets-Sheet 3

Walter P. Schmitter
INVENTOR.

BY
Ralph... Brown,
ATTORNEY.

Patented Feb. 16, 1943

2,311,597

UNITED STATES PATENT OFFICE 2,311,597

POWER TRANSMISSION

Walter P. Schmitter, Wauwatosa, Wis., assignor to The Falk Corporation, Milwaukee, Wis., a corporation of Wisconsin Application February 26, 1941, Serial No. 380,594

12 Claims. (Cl. 74—389)

This invention relates to power transmissions primarily for use in transmitting power from a plurality of driving members to a driven member in such manner as to effect operation of the driven member in either of two directions selectively, although other uses are contemplated.

An object of the invention is to improve and simplify transmissions of this type.

Other more specific objects and advantages will appear from the following description of an illustrative embodiment of the present invention.

In the accompanying drawings:

Fig. 3 is an end elevation.

Fig. 5 is a perspective view of a control system for the transmission.

Figure 1:
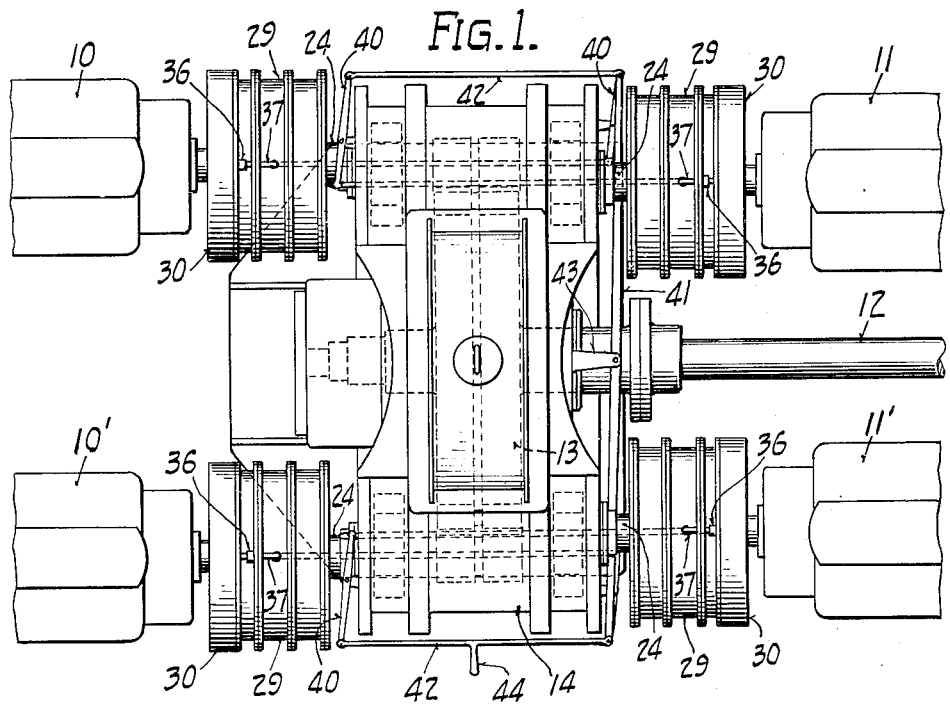
Figure 1 is a plan view of a power transmission constructed in accordance with the present invention.
Figure 2:
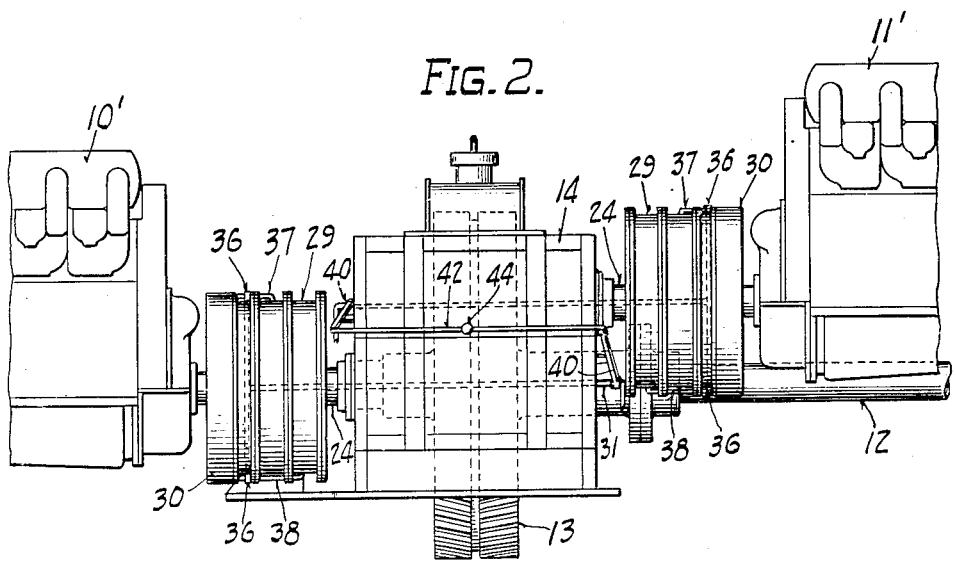
Fig. 2 is a side elevation.

The power transmission selected for illustration is shown disposed between two pairs of parallel internal combustion engines 10—10' and 11—11' and coupled to a driven shaft 12 disposed parallel to and between one of the pairs of engines 11—11'. The engines 11 and 11' are mounted at a somewhat higher level than the engines 10 and 10' of the other pair for a purpose which will presently appear.

In this instance the power transmission includes a main gear 13 journalled in an appropriate housing 14 and coupled to the driven shaft 12. It also includes two pairs of pinions 15—15' and 16—16', each meshing with the main gear 13. The pinions 15 and 15' of one pair are arranged at opposite sides of the main gear 13 and substantially coaxially disposed with respect to the crank shafts of the engines 10 and 10' of the lower pair; and the pinions 16—16' of the other pair are also disposed at opposite sides of the main gear above the pinions 15 and 15', respectively, each being substantially coaxially disposed with respect to the crank shaft of one of the upper pair of engines 11 and 11'.

Figure 4:
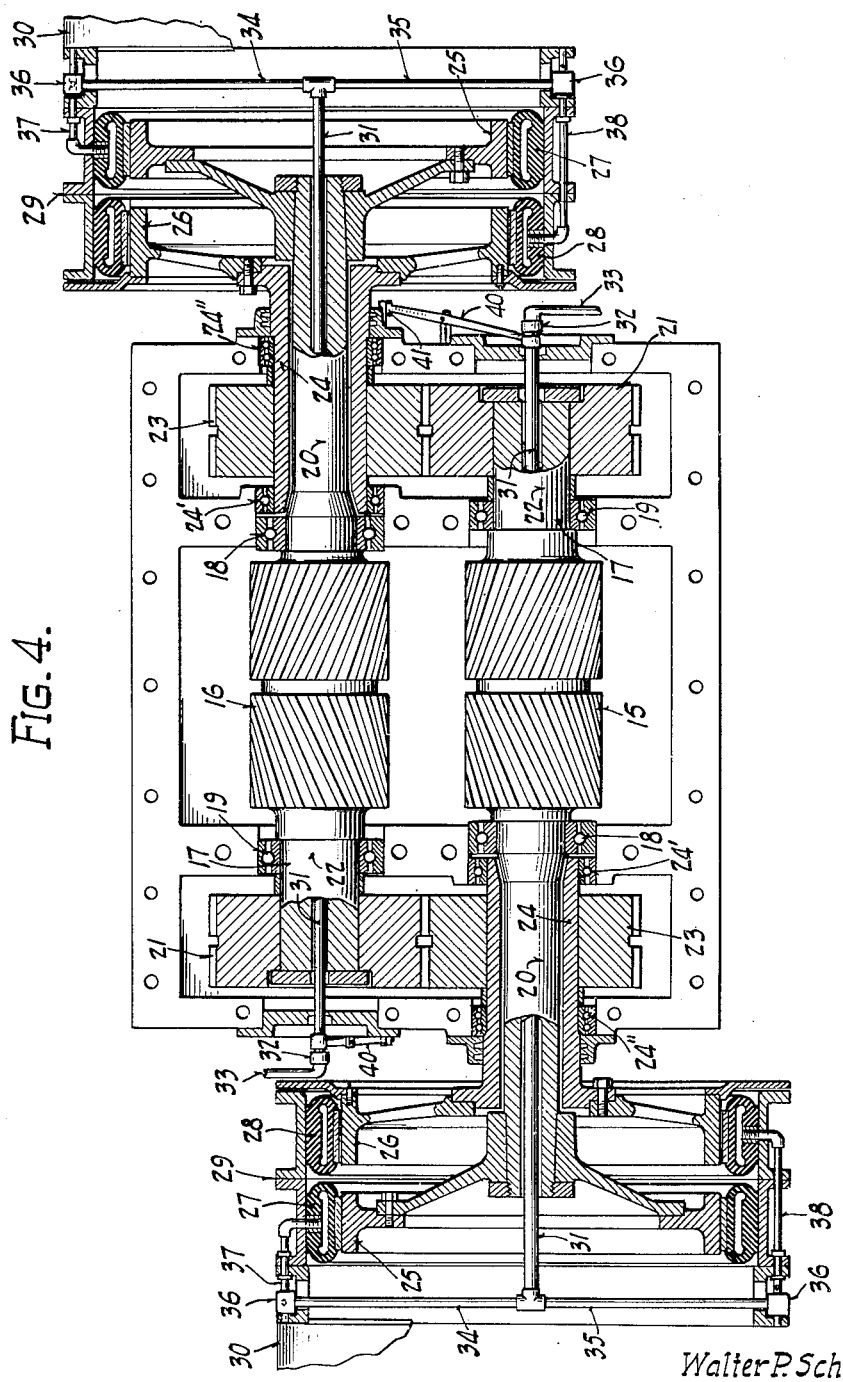
Fig. 4 is a sectional view on a larger scale taken substantially along the line 4—4 of Fig. 3.

Each of the several pinions 15, 15', 16 and 16' is similarly mounted and driven so that a description of one will suffice for all. As indicated particularly in Fig. 4, each is carried by and rotatable with a shaft 17 journalled in spaced bearings 18 and 19 in the housing, one end 20 of the shaft being extended beyond the housing toward the engine crank shaft with which it is aligned and to which it is releasably connectable for rotation in one direction, through an appropriate clutch preferably of a type which will be hereinafter described. Each shaft 17 is also releasably connectable to another engine through gearing designed to effect rotation thereof in the opposite direction. In this instance the gearing employed for this purpose includes a pinion 21 fixed to the other end 22 of the shaft 17 and meshing with a pinion 23 fixed to a quill shaft 24 surrounding the adjacent shaft 17. Each quill shaft 24 is journalled in appropriate bearings 24' and 24" in the housing and is releasably connectable to the engine with which it is aligned.

It will be understood that when the several shafts 17 are connected to the engine shafts with which they are respectively aligned, the several pinions 15, 15', 16 and 16' are all directly driven in the same direction and cooperate to drive the main gear 13 and shaft 12 in one direction; but when the quill shafts 24 are connected to the engine shafts with which they are respectively aligned, the several pinions 15, 15', 16 and 16' are all indirectly and reversely driven, each through a set of intermeshing pinions 23 and 21, and they therefor cooperate to drive the main gear 13 and shaft 12 in an opposite direction.

Although various forms of clutches may be employed, I prefer to use clutches of the fluid pressure type, a pair of coaxial clutches being associated with each engine. One clutch of each pair includes an inner clutch ring 25 carried by and rotatable with an end 20 of a pinion shaft 17, and the other includes a similar ring 26 carried by and rotatable with the coaxial quill shaft 24. One clutch also includes a flexible fluid pressure gland 27 expansible into gripping engagement with the ring 25, and the other a similar flexible fluid pressure gland 28 expansible into gripping engagement with the ring 26. Both glands 27 and 28 are carried by a surrounding drum 29 carried by and rotatable with the flywheel 30 of the adjacent engine. The arrangement is such that when fluid pressure is admitted to the gland 27 to expand the same against the ring 25, the connected pinion shaft 17 is thereby directly connected to rotate with the engine shaft with which it is aligned, and when fluid pressure is admitted to the gland 28 to expand the same against the ring 26, the quill shaft 24 is thereby connected to rotate with the adjacent engine shaft, and this motion transmitted through the connected pinions 23 and 22 causes the adjacent pinion shaft 17 to rotate in a direction opposite to engine rotation.

It will be noted that the pinions 21 and 23 of each set may be of the same size so that rotation thereby imparted to a pinion shaft 17 from the clutch gland 28 may be at the same rate as that imparted from the clutch gland 27; or the pinions 21 and 23 of each set may be of different sizes so as to effect rotation of the pinion shaft 17 at a higher or lower rate.

The clutch glands 27 and 28 may be made of any appropriate flexible material, such as rubber or rubber reinforced with fabric or cords as in ordinary pneumatic tire construction. It will also be understood that when either gland is opened to atmospheric pressure it automatically contracts away from and out of gripping engagement with the adjacent inner clutch ring, due to an inherent bias and to the centrifugal forces resulting from rotation of the gland with the outer drum.

The admission and exhaust of fluid pressure to and from the glands of each pair of clutches may be variously controlled, but in this instance this is effected by means such as disclosed in the copending application of myself and Daniel M. Schwartz, Serial No. 353,224. As in said copending application, fluid pressure is supplied to the clutches of each pair through a rigid conduit 31 which extends axially through the adjacent pinion shaft 17 and is lengthwise movable therein. Fluid pressure is supplied to the conduit 31 through an appropriate slip joint 32 at one end thereof, the joint permitting free rotation of the conduit with respect to a non-rotating supply connection 33.

At its other end, the conduit 31 carries and communicates with two radially extending rigid conduits 34 and 35 each of which is connected to and communicates with a moveable valve element 36. Each element 36 is slidably mounted on a ported tube 37 which communicates with the clutch gland 27 or on a ported tube 38 which communicates with the clutch gland 28. As more fully disclosed in the copending application above identified, lengthwise movement of the conduit 31 and connected conduits 34 and 35 into one position effects communication between the conduit 31 and one of the glands 27 through the ported tube 37 and simultaneously effects exhaust of the other gland 28 through the ported tube 38; and opposite movement into another position effects communication between the conduit 31 and the gland 28 through the tube 38 and effects exhaust of the gland 27 through the tube 37. It will thus be noted that by a simple lengthwise movement of the conduit 31 in one direction, one clutch of the pair is opened and the other closed, and by lengthwise movement in the opposite direction the last named clutch is opened and the first named clutch is closed. By virtue of this arrangement neither clutch of the pair can be closed while the other is closed.

Provision is made for effecting simultaneous control of all four pairs of clutches. Although this might be accomplished in various ways I have selected, for purposes of illustration, a simple manually controlled mechanical system for the purpose. In the system shown, the longitudinal position of each conduit 31 is individually controlled by a separate lever 40 rockably supported upon the transmission housing. Two of the levers 40 extend upwardly and outwardly from the lower conduits 31 with which they are respectively engaged, both being connected at their outer ends to a control lever 41. The other two levers 40 extend downwardly and outwardly from the upper conduits 31 with which they are respectively engaged, both being connected at their outer ends with links 42. The control lever 41 is rockably supported intermediate its ends on a bracket 43 at one end of the transmission housing and extends transversely thereof. It is pivotally connected at its opposite ends to links 42 to actuate the same in unison, one of the links being provided with an appropriate handle 44.

The arrangement is such that, when the handle 44 is shifted toward the left, the several levers 40 are thereby actuated to simultaneously shift the several conduits 31 in such directions as to expose the several clutch glands 27 to fluid pressure and thereby effect direct driving connections between the several engines and their aligned pinions so as to produce rotation of the driven shaft 12 in one direction; and when the handle 44 is shifted toward the right, the several conduits are similarly actuated in such directions so as to simultaneously expose the other clutch glands 28 to fluid pressure and thereby effect driving connections between the several engines and the quill shafts with which they are aligned, so as to cause each engine to drive through the pinions 23 and 21 and thus effect rotation of the driven shaft 12 in an opposite direction.

Provision is made for disconnecting any one of the engines from the transmission by exhausting both clutch glands 27 and 28 associated therewith. In this instance the several conduits 31 are normally supplied with fluid pressure through a system, comprising a main supply pipe 45 and branch pipes 46, to which each of the conduits 31 is connected through a flexible hose 47 in a manner to permit free lengthwise movement of the conduits in the manner above described. A valve 48 controls communication between each conduit 31 and its associated hose 47. Each valve 48 is a three-way valve of a well known type which is effective in one position to connect the conduit with the associated hose and in another position to open the conduit to atmosphere. It will of course be understood that with each of the several valves 48 in the position first mentioned, one or the other of the clutch glands 27 or 28 of each pair of clutches is subjected to fluid pressure dependent upon the longitudinal position of the associated conduit 31, as above explained; but with any of the valves 48 in a position to open its connected conduit 31 to atmosphere, both clutch glands 27 and 28 associated therewith remain exhausted, irrespective of the longitudinal position of the connected conduit, and the particular engine with which that conduit is associated will of course remain disconnected from the transmission.

A three-way valve 49, similar to the valves 48, is also preferably included within the main supply pipe 45 and adjustable to connect both branch pipes thereto or to open both branch pipes 46 to atmosphere. It will of course be understood that when the valve 49 is in position to open the pipes 46 to atmosphere, the glands 27 and 28 of all of the clutches become exhausted and all of the engines are thereby disconnected from the transmission.

Various changes may be made in the embodiment of the invention hereinabove specifically described without departing from or sacrificing the advantages of the invention as defined in the appended claims.

I claim:

1. In a power transmission the combination of a gear, two parallel pinions meshing therewith, and a pair of clutches coaxially disposed with respect to each of said pinions, one clutch of each pair including a rotor connected to rotate with one of said pinions, and the other clutch of each pair including a rotor geared to the other of said pinions.

2. In a power transmission the combination of a gear, two parallel pinions meshing therewith, two gear trains each including a gear coaxially disposed with respect to one of said pinions and operatively connected with the other of said pinions, a pair of clutches coaxially disposed with respect to each of said pinions, one clutch of each pair including a rotor connected to rotate with that pinion with which it is coaxially disposed, and the other clutch of each pair including a rotor connected to rotate with that gear with which it is coaxially disposed, and means for controlling said clutches.

3. In a power transmission the combination of a gear, two parallel pinions meshing therewith, two gear trains each including a gear coaxially disposed with respect to one of said pinions and operatively connected with the other of said pinions, and a pair of clutches coaxially disposed with respect to each of said pinions, one clutch of each pair including a rotor connected to rotate with that pinion with which it is coaxially disposed, the other clutch of each pair including a rotor connected to rotate with that gear with which it is coaxially disposed, and each of said clutches also including a fluid pressure member operable to open and close the same.

4. In a power transmission the combination of a driven gear, a pair of parallel pinions meshing therewith to drive the same, a pair of drivers disposed coaxially of said pinions respectively, means including a clutch for releasably connecting each of said drivers with that pinion with which it is coaxially disposed, and means including a clutch for releasably connecting each of said drivers with the other of said pinions.

5. In a power transmission the combination of a driven gear, a pair of parallel pinions meshing therewith to drive the same, a pair of drivers disposed coaxially of said pinions respectively, means including a clutch for releasably connecting each of said drivers to that pinion with which it is coaxially disposed for operation in one direction, and means including a second clutch for releasably connecting each of said drivers to the other of said pinions, said last named means also including a gear train for effecting operation of said pinions in an opposite direction.

6. In a power transmission the combination of a driven gear, a pair of pinions meshing therewith to drive the same, a driver disposed adjacent one end of one of said pinions, first means selectively operable to connect said driver with either of said pinions alternatively, a second driver disposed adjacent the opposite end of the other of said pinions, and second means selectively operable to connect said driver with either of said pinions alternatively, each of said first and second means including a gear train for reversing the direction of operation of said pinions.

7. In a power transmission mechanism the combination of a driven gear, a pair of parallel pinions meshing therewith to drive the same, a driver disposed adjacent one end of one of said pinions, first means selectively operable to connect said driver with either of said pinions alternatively, means extending through said adjacent pinion for controlling said first means, a second driver disposed adjacent the opposite end of the other of said pinions, second means selectively operable to connect said second driver with either of said pinions alternatively, and means extending through said last named adjacent pinion for controlling said second means, each of said first and second means including a gear train for reversing the direction of operation of said pinions.

8. In a power transmission mechanism the combination of a gear set comprising a driven gear and two driving pinions meshing therewith, two drivers disposed at opposite sides of said gear set, means including a clutch for releasably connecting one of said drivers with one of said pinions to drive the same in one direction, means including a gear train and a second clutch for releasably connecting said last named driver to the other of said pinions to drive the same in the opposite direction, means including a third clutch for releasably connecting the other of said drivers to the other of said pinions to drive the same in the direction first named, means including a gear train and fourth clutch for releasably connecting said last named driver to said first named pinion to drive the same in said reverse direction, and means selectively operable to simultaneously close said first and third clutches to thereby effect operation of said driven gear in one direction or to simultaneously close said second and fourth clutches to thereby effect operation of said driven gear in a reverse direction.

9. In a power transmission mechanism the combination of a driven gear, two driving pinions meshing therewith at opposite sides of the axis thereof, two drivers at one side of said gear and coaxially disposed with respect to said pinions respectively, two additional driving pinions disposed adjacent said first named pinions respectively, two additional drivers at the other side of said gear and coaxially disposed with respect to said last named pinions respectively, means including a clutch for releasably connecting each of said drivers to that pinion coaxially related thereto so as to drive said gear in one direction, and means including a gear train and clutch for releasably connecting each of said drivers to another of said pinions so as to drive said driven gear in an opposite direction, and means operable to simultaneously close either said first named clutches or said last named clutches alternatively to thereby drive said driven gear in either direction.

10. In a power transmission the combination of a driven gear, two pinions meshing therewith to drive the same, two drivers, means including a first fluid pressure clutch for releasably connecting one of said drivers to one of said pinions, means including a gear train and second fluid pressure clutch for releasably connecting said driver to said other pinion, means including a third fluid pressure clutch for releasably connecting said other driver to said other pinion, means including a gear train and a fourth fluid pressure clutch for releasably connecting said other driver to said first mentioned pinion, means adjustable to direct fluid pressure simultaneously to said first and third clutches or simultaneously to said second and fourth clutches alternatively, and independently operable means for releasing said first and second clutches or said third and fourth clutches to thereby disconnect either of said drivers from both of said pinions.

11. In a power transmission the combination of a driven gear, two pinions meshing therewith to drive the same, two drivers, means including a first clutch for releasably connecting one of said drivers to one of said pinions, means including a second clutch for releasably connecting said driver to said other pinion, means including a third clutch for releasably connecting said other driver to said other pinion, means including a fourth clutch for releasably connecting said other driver to said first named pinion, means operable to simultaneously close said first and third clutches or said second and fourth clutches alternatively, and means independently operable to open said first and second clutches or said third and fourth clutches to thereby disconnect either of said drivers from both of said pinions.

12. In a power transmission the combination of a driven gear, two pinions meshing therewith to drive the same, two drivers, means including a first clutch for releasably connecting one of said drivers to one of said pinions, means including a second clutch for releasably connecting said driver to said other pinion, means including a third clutch for releasably connecting said other driver to said other pinion, means including a fourth clutch for releasably connecting said other driver to said first named pinion, means operable to simultaneously close said first and third clutches or said second and fourth clutches alternatively, means independently operable to open said first and second clutches or said third and fourth clutches to thereby disconnect either of said drivers from both of said pinions, and other means operable to open all of said clutches to thereby disconnect both drivers from both of said pinions.

WALTER P. SCHMITTER.